(12) United States Patent
Asano

(10) Patent No.: US 7,675,696 B2
(45) Date of Patent: Mar. 9, 2010

(54) LENS BARREL AND IMAGING APPARATUS INCLUDING THE SAME

(75) Inventor: Kota Asano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 11/972,341

(22) Filed: Jan. 10, 2008

(65) Prior Publication Data

US 2008/0174882 A1    Jul. 24, 2008

(30) Foreign Application Priority Data

Jan. 18, 2007  (JP)  ............................. 2007-009158
Sep. 3, 2007   (JP)  ............................. 2007-227606

(51) Int. Cl.
  *G02B 7/02* (2006.01)
(52) U.S. Cl. ..................................... 359/819
(58) Field of Classification Search ......... 359/819–825, 359/694
  See application file for complete search history.

(56) References Cited

U.S. PATENT DOCUMENTS

| | | | | |
|---|---|---|---|---|
| 4,353,634 A | * | 10/1982 | Himmelsbach | 396/79 |
| 5,684,640 A | * | 11/1997 | Tanaka et al. | 359/694 |
| 6,752,540 B2 | * | 6/2004 | Orimoto | 396/349 |
| 2002/0063971 A1 | * | 5/2002 | Imanari et al. | 359/696 |
| 2003/0107667 A1 | * | 6/2003 | Abe et al. | 348/341 |
| 2005/0007679 A1 | * | 1/2005 | Makii et al. | 359/694 |

FOREIGN PATENT DOCUMENTS

JP    2002-296481 A    10/2002

* cited by examiner

*Primary Examiner*—Scott J Sugarman
*Assistant Examiner*—Vipin M Patel
(74) *Attorney, Agent, or Firm*—Canon U.S.A., Inc. I.P. Division

(57) ABSTRACT

A lens barrel includes a first lens set configured to move manually along an optical axis, a second lens set configured to move electrically along the optical axis, a first holding member configured to hold the first lens set, a second holding member configured to hold the second lens set, a driving member configured to move the second holding member along the optical axis, a transmitting member configured to transmit a driving force of the driving member to the second holding member, and an urging member configured to relatively urge the transmitting member and the second holding member along the optical axis. The first lens set is movable within a range of motion of the second lens set. The urging member is displaced when the second holding member interferes with the first holding member.

7 Claims, 9 Drawing Sheets

LENS BARREL AND IMAGING APPARATUS INCLUDING THE SAME

BACKGROUND OF THE INVENTION

1. Field of the Invention

The present invention relates to a lens barrel for use in, for example, a digital still camera, a video camera, and an interchangeable lens, and in particular, to a lens barrel that manually performs a zooming operation.

2. Description of the Related Art

There exist rear-focusing lens barrels that include a focus lens disposed at an image-plane side to a zoom lens and configured to correct image-plane variations occurring with motion of the zoom lens and to perform a focusing operation.

One example of such lens barrels is a lens barrel that performs zooming by a manual operation (manual zoom operation) and focusing by an electric operation (automatic focus operation) to improve a shooting operation.

One such example is a lens barrel disclosed in Japanese Patent No. 03514245, which includes peripheral members disposed in a range of motion of a focus moving frame. In this lens barrel, a zoom moving frame is subjected to a zooming operation performed manually at high speed.

During this operation, an urging member is configured to absorb interference occurring between the focus moving frame and other peripheral members. The focus moving frame is coupled via a cam to a zoom driving member for moving the zoom moving frame along the optical axis. The zoom driving member is rotated, thereby moving the focus moving frame along the optical axis.

A focusing operation is carried out by movement of a holding member that holds the focus lens along the optical axis using a focus driving member attached on the focus moving frame. Accordingly, the focusing operation is independent of the operation of the zoom driving member.

The urging member urges the focus-lens holding member and the zoom driving member along the optical axis in a direction that separates both members away from each other while being positioned between both members. The urging direction is a direction that reduces rattling of a screw mechanism that screws the focus-lens holding member along the optical axis.

However, for the lens barrel disclosed in the above-mentioned patent document, because the focus-lens holding member and the zoom driving member are urged in a direction that separates both members away from each other, the focus driving member undergoes resistance of the urging member, in addition to resistance of the focus lens itself.

Therefore, it is necessary for the focus driving member to normally have a driving force that overcomes the total of the resistance of the focus lens itself and the resistance of the urging member.

Additionally, the coupling structure between the focus moving frame and the zoom driving member via a cam results in an increases in the size of the lens barrel caused by an increase in the size of the cam ring, mounting of a component required for the cam coupling, and a complicated structure of components.

SUMMARY OF THE INVENTION

The present invention provides a lens barrel including a first lens set configured to move manually along an optical axis, a second lens set configured to move electrically along the optical axis, a first holding member configured to hold the first lens set, a second holding member configured to hold the second lens set, a driving member configured to move the second holding member along the optical axis, a transmitting member configured to transmit a driving force of the driving member to the second holding member, and an urging member configured to relatively urge the transmitting member and the second holding member along the optical axis. The first lens set is movable within a range of motion of the second lens set. The urging member is displaced when the second holding member interferes with the first holding member.

According to an aspect of the present invention, the lens barrel includes the structure configured to relatively urge the transmitting member and the second holding member along the optical axis and disposed therebetween.

Therefore, an advantage can be obtained in which, even when the second holding member interferes with the first holding member, mechanical resistance applied to the driving member other than the resistance of the second lens set can be reduced.

In addition, a cam is not used to couple the first lens set and the second lens set. Accordingly, another advantage can be obtained that results in a reduction in the size of the lens barrel caused by a size reduction of the cam ring, omits a component required for cam coupling, and contributes to a simplified structure of components.

Further features and aspects of the present invention will become apparent from the following description of exemplary embodiments with reference to the attached drawings.

DESCRIPTION OF THE EMBODIMENTS

Various embodiments of the present invention will be described below with reference to the accompanying drawings.

First Exemplary Embodiment

Figure 1:
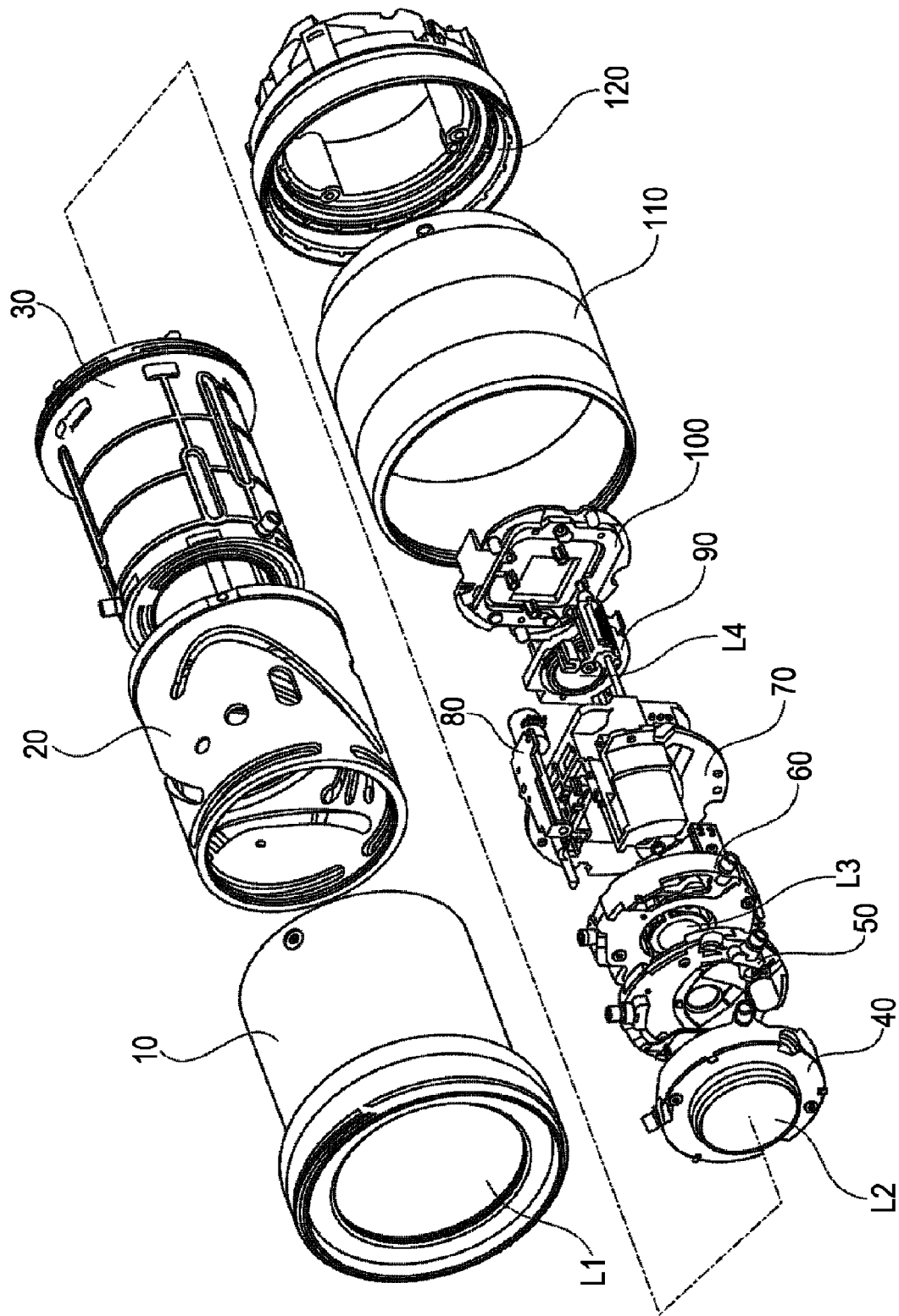
FIG. 1 is an exploded perspective view that illustrates an example configuration of a lens barrel according to a first embodiment of the present invention.
Figure 2:
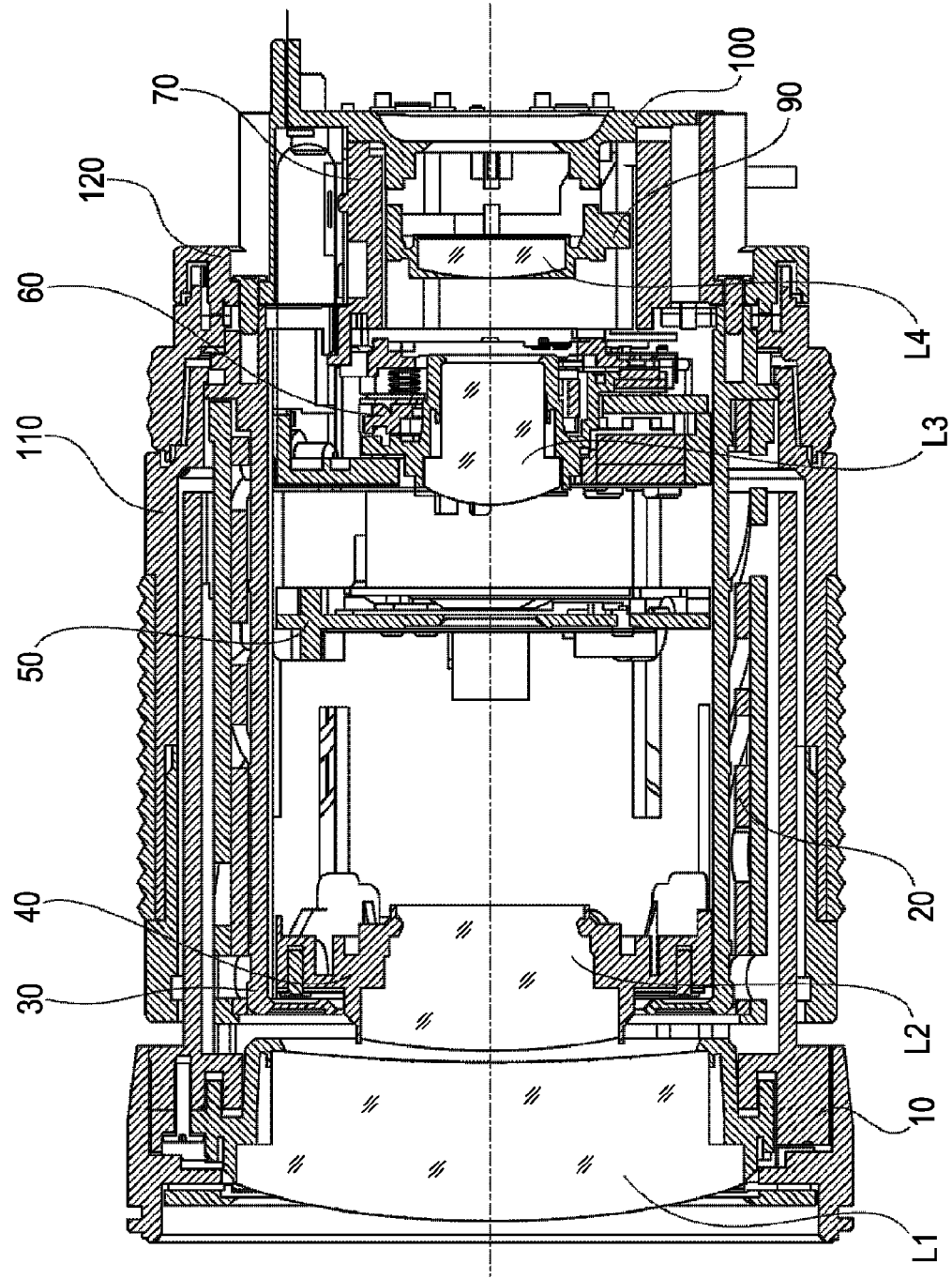
FIG. 2 is an optical cross-sectional view that illustrates an example configuration of the lens barrel (at a wide-angle position) according to the first embodiment.
Figure 3:
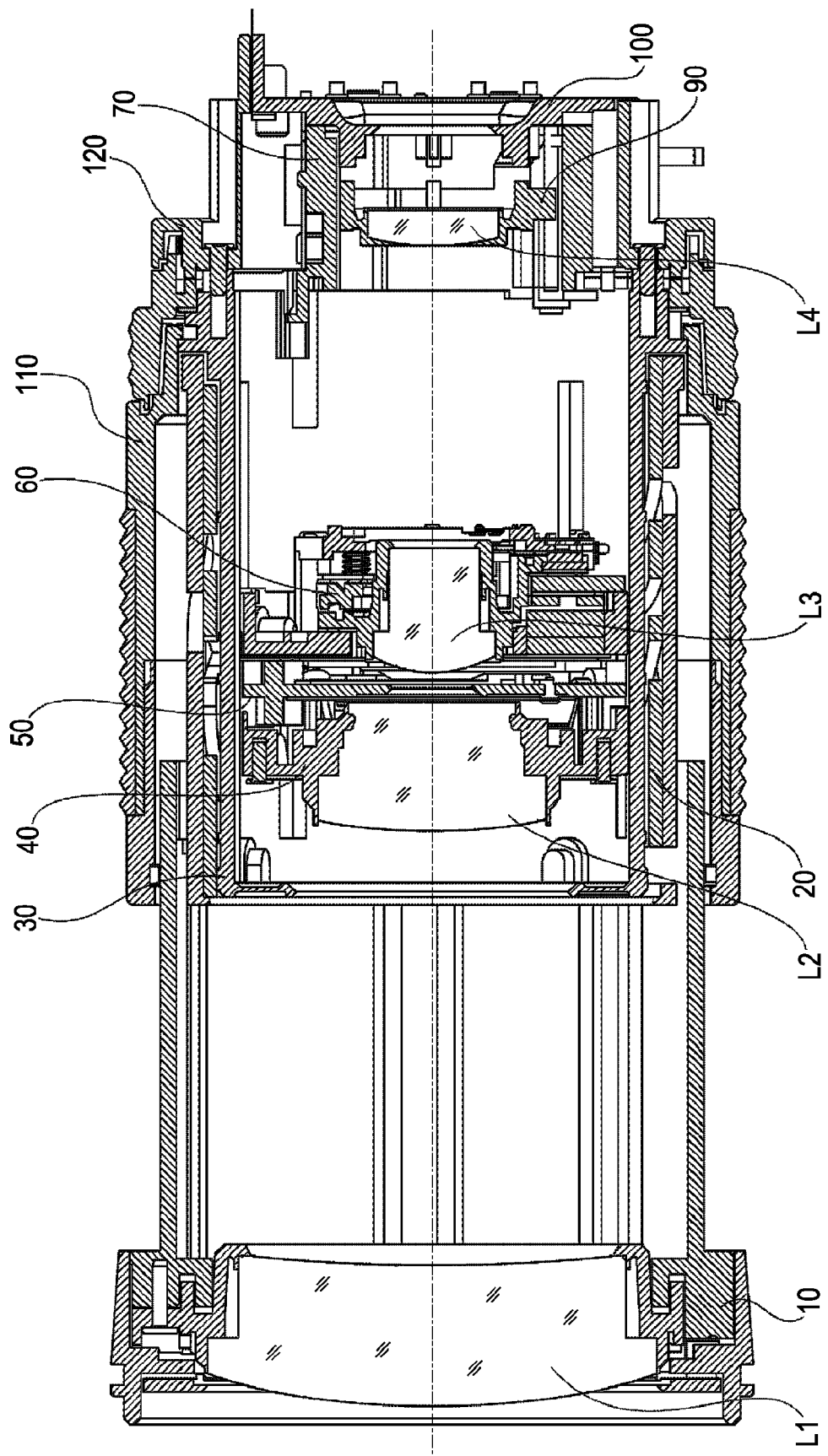
FIG. 3 is an optical cross-sectional view that illustrates an example configuration of the lens barrel (at a telephoto position) according to the first embodiment.

FIG. 1 is an exploded perspective view that illustrates a configuration of a lens barrel for use in an imaging device to which the present embodiment is applicable, such as a video camera and a digital still camera. FIGS. 2 and 3 are optical cross-sectional views that illustrate a configuration of a lens barrel in an imaging device to which the present embodiment is applicable, such as a video camera and a digital still camera. FIG. 2 illustrates the state of each lens set at a wide-angle position. FIG. 3 illustrates the state of each lens set at a telephoto position.

The lens barrel according to the present embodiment includes four lens sets. In FIG. 1, lens sets L1, L2, and L3 have the capability of zooming; L1 is a first zoom lens set, L2 is a second zoom lens set, and L3 is a third zoom lens set. The third zoom lens set L3 moves in a direction substantially perpendicular to the optical axis to optically correct image blurring. The third zoom lens set L3 corresponds to a first lens set that manually moves along the optical axis. A focus lens set L4 performs focusing electrically and corresponds to a second lens set.

A zoom operation ring 110 for enabling a manual operation is disposed at the outermost front surface of the lens barrel. When the zoom operation ring 110 is rotated from a wide-angle state shown in FIG. 2, each of a first zoom lens unit 10, a second zoom lens unit 40, an aperture mechanism unit 50 being a light-quantity variable device, a third zoom lens unit 60 being an image-blur optical correction unit, and a focus lens unit 90 is moved toward a telephoto state shown in FIG. 3 from the wide-angle state shown in FIG. 2.

The first zoom lens unit 10, the aperture mechanism unit 50, and the third zoom lens unit 60 are moved to an object side by respective distances. The second zoom lens unit 40 is moved to an image plane side.

In FIG. 1, when the zoom operation ring 110 for enabling a manual operation is rotated, a zoom cam ring 20 is also rotated. The zoom cam ring 20 has a spiral cam groove (not shown) that guides movement of each unit. A fixing barrel 30 has a translatory guide groove. The first zoom lens unit 10, the second zoom lens unit 40, the aperture mechanism unit 50, and the third zoom lens unit 60 are guided by the cam groove and the translatory guide groove, and are moved as a zooming operation along the optical axis.

The focus lens unit 90 for performing a focusing operation electrically (autofocusing) is guided along the optical axis by a guide shaft (not shown) whose both ends are supported by an intermediate barrel 70 and a rear barrel 100.

The rear barrel 100 holds an image pickup element (not shown) that photoelectrically converts an image of an object formed by an imaging optical system, such as a charge-coupled device (CCD) or a complementary metal-oxide semiconductor (CMOS) sensor.

A coupling barrel 120 holds the lens barrel to an imaging device, such as a video camera or a digital still camera. Both the intermediate barrel 70 supporting the focus lens unit and the coupling barrel 120 are fixed to the fixing barrel 30.

In the lens barrel of the present embodiment, a focus motor unit 80 is used as a focus driving member that generates a driving force for moving the focus lens unit 90 along the optical axis. The focus motor unit 80 is secured to the intermediate barrel 70 by screws.

Figure 4:
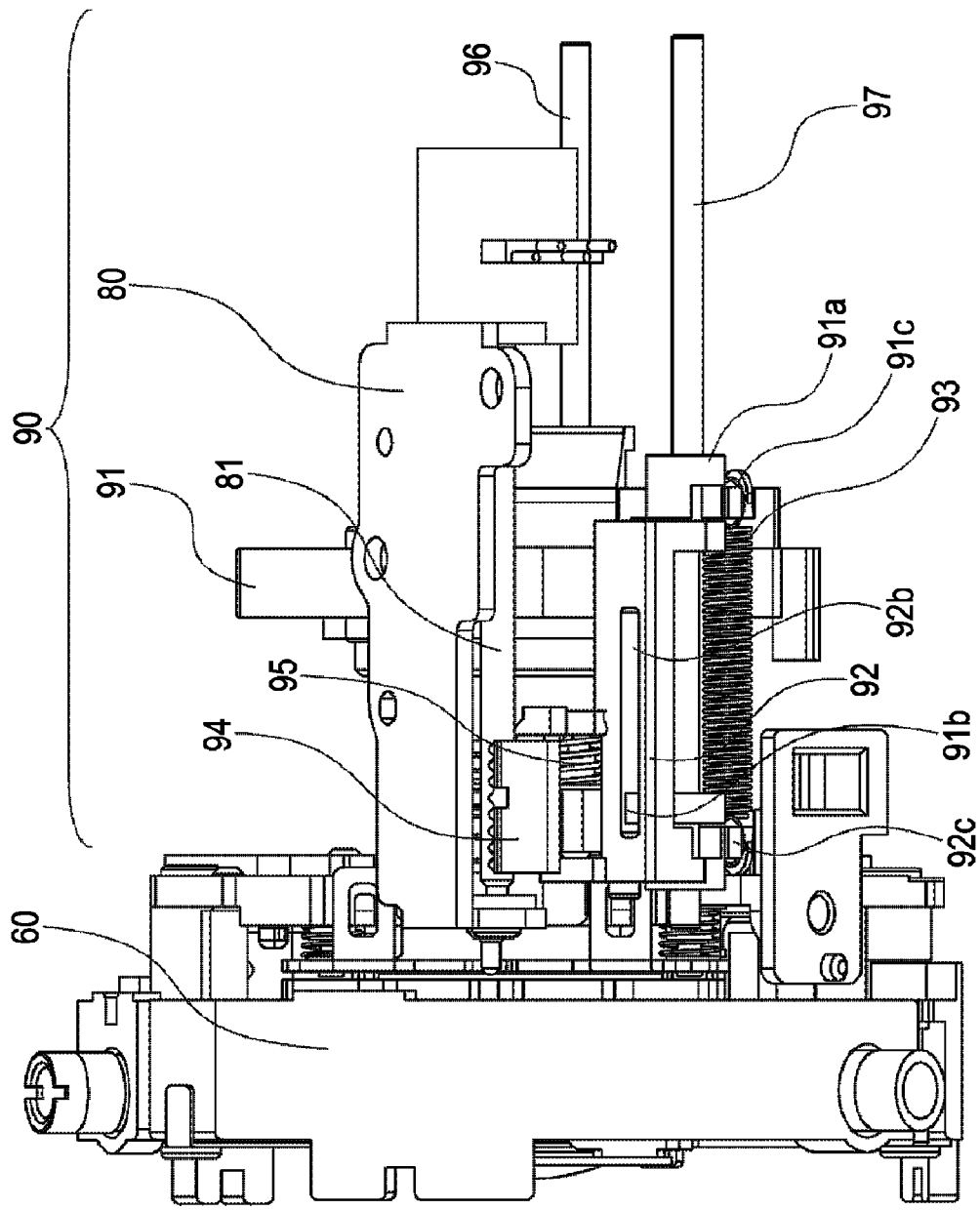
FIG. 4 illustrates an example focus lens unit in the lens barrel according to the first embodiment.

FIG. 4 illustrates a schematic structure of the focus lens unit 90. The focus motor unit 80 serves as a focus driving member that drives a focus-lens holding member 91 along the optical axis. A first guide shaft 96 extends along the optical axis. The first guide shaft 96 is engaged with a U-shaped groove (not shown) formed in the focus-lens holding member 91 holding the focus lens set L4 such that the focus-lens holding member 91 is movable along the optical axis. A second guide shaft 97 extends along the optical axis.

The focus-lens holding member 91 is moved along the optical axis by a driving force generated by the focus motor unit 80 being the focus driving member. The second guide shaft 97 is engaged with a first sleeve 91a of the focus-lens holding member 91 and a second sleeve 92 such that the first sleeve 91a and the second sleeve 92 are movable along the optical axis. The second sleeve 92 corresponds to a transmitting member.

The first sleeve 91a and the second sleeve 92 are engaged via a projection 91b formed on the first sleeve 91a and a through-hole 92b formed in the second sleeve 92. With this engagement, both sleeves are allowed to be relatively moved along the optical axis and are prevented from being relatively rotated.

The first sleeve 91a and the second sleeve 92 are coupled together with an extension spring 93 connecting a convex portion 91c formed on the first sleeve 91a and a convex portion 92c formed on the second sleeve 92. The first sleeve 91a and the second sleeve 92 are relatively urged by the extension spring 93.

The urging force of the extension spring 93 as an urging member satisfies the relationship A<B, where A is the total weight of the focus lens set L4 and the focus-lens holding member 91 and B is the urging force of the extension spring 93 when displacement is at a minimum.

By using the above-described structure, a mechanical resistance other than resistance of the focus lens set L4 to the focus motor unit 80 in a normal focusing operation can be suppressed.

The first sleeve 91a is engaged with the second guide shaft 97, thus allowing the focus-lens holding member 91 to be guided along the optical axis. The U-shaped groove (not shown) is engaged with the first guide shaft 96, thus preventing rotation about the second guide shaft 97.

A rotor (not shown) driven by the focus motor unit 80 electrically performing a focusing operation (autofocusing) is integrally provided with a feed screw 81. The feed screw 81 meshes with a rack 94 mounted on the second sleeve 92 engaged with the first sleeve 91a of the focus-lens holding member 91. When the feed screw 81 is rotated together with the rotor (not shown), the focus-lens holding member 91 is driven along the optical axis by virtue of the mesh of the feed screw 81 and the rack 94.

The focus-lens holding member 91, the rack 94, the feed screw 81, the first guide shaft 96, and the second guide shaft 97 are biased by a torsion coil spring 95, thereby reducing rattling among them.

Various motors can be used as the focus motor unit 80 illustrated in FIG. 4. Examples include a stepping motor, a direct-current (DC) motor, and a vibration motor.

When focus driving is properly controlled, the state is in the one illustrated in FIG. 4, where no problem arises. However, if the zoom operation ring 110 is rotated in an uncontrollable state when the power of the camera is in off or if the zoom operation ring 110 is manually rotated at high speed even in a controllable state, a focus control operation undesirably stops or lags.

Figure 5:
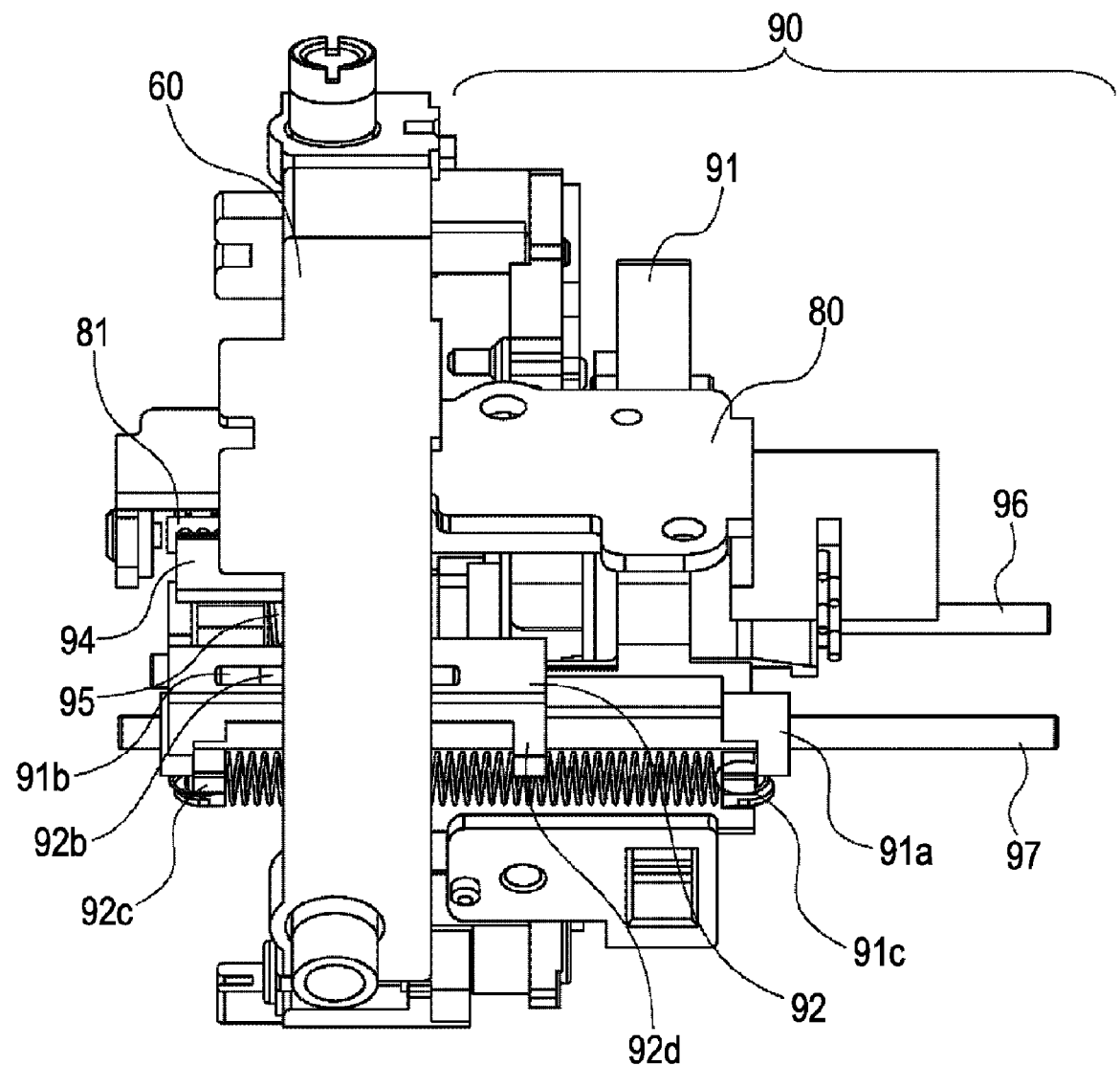
FIG. 5 illustrates a state in which a focus control operation lags in the lens barrel according to the first embodiment.

FIG. 5 illustrates such a condition described above. Although the focus-lens holding member 91 and the focus motor unit 80 attempt to move toward the object side at high speed, the focus-lens holding member 91 is not held at a normal place because the image-blur optical correction unit 60 moves more quickly than both.

That is, the focus-lens holding member 91 and the image-blur optical correction unit 60 (which holds the third zoom lens set L3) are in contact with each other. This means that interference occurs between both lens holding members.

At this time, the focus-lens holding member 91 cannot return to the normal place illustrated in FIG. 4 or the control operation lags. When the power of the camera is turned on and the control operation starts or when the control operation catches up to normal after a while, the state is then brought into the one illustrated in FIG. 4.

In such a way, the focus-lens holding member 91 and the second sleeve 92 are separated from a state in which both are relatively urged by the extension spring 93 as illustrated in FIG. 4 by a stroke for which interference occurs, thus absorbing the interference.

The urging force of the extension spring 93 as an urging member when displacement is at a maximum satisfies the relationship B'<C, where B' is the urging force of the extension spring 93 when displacement is at the maximum and C is the minimum force generated by the motor.

In addition, the relationship D<E is satisfied, where D represents the overlap range of a range of motion of the third zoom lens set L3 and a range of motion of the focus lens set L4 (i.e., interference stroke) and E represents the distance along the optical axis between the convex portion 91c of the first sleeve 91a and a rear end 92d of the second sleeve 92 when the displacement of the extension spring 93 as an urging member is at a maximum (i.e., interference absorption stroke).

To absorb the interference, each of the abutting surfaces of the focus-lens holding member 91 and the image-blur optical correction unit 60 can be a surface of a structural component, such as a holding member, not a lens surface.

As described above, in the present embodiment, interference is absorbed by separation from a state in which the focus-lens holding member 91 and the second sleeve 92 are relatively urged by the extension spring 93 as illustrated in FIG. 4. Accordingly, in a normal focusing operation, except when interference occurs, an advantage can be obtained that can suppress mechanical resistance other than resistance of the focus lens set L4.

Figure 6:
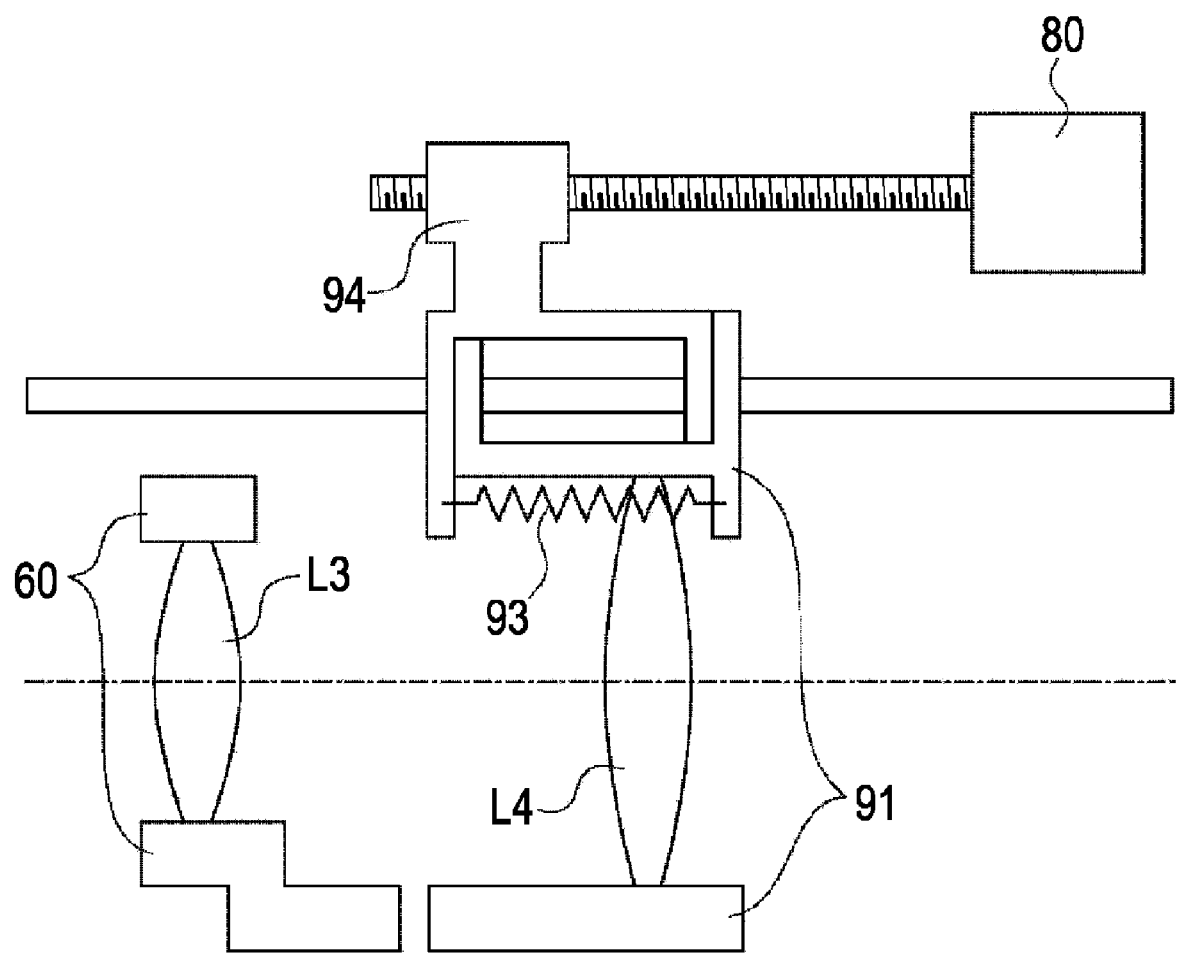
FIG. 6 is a schematic diagram of the focus lens unit in the lens barrel according to the first embodiment.
Figure 7:
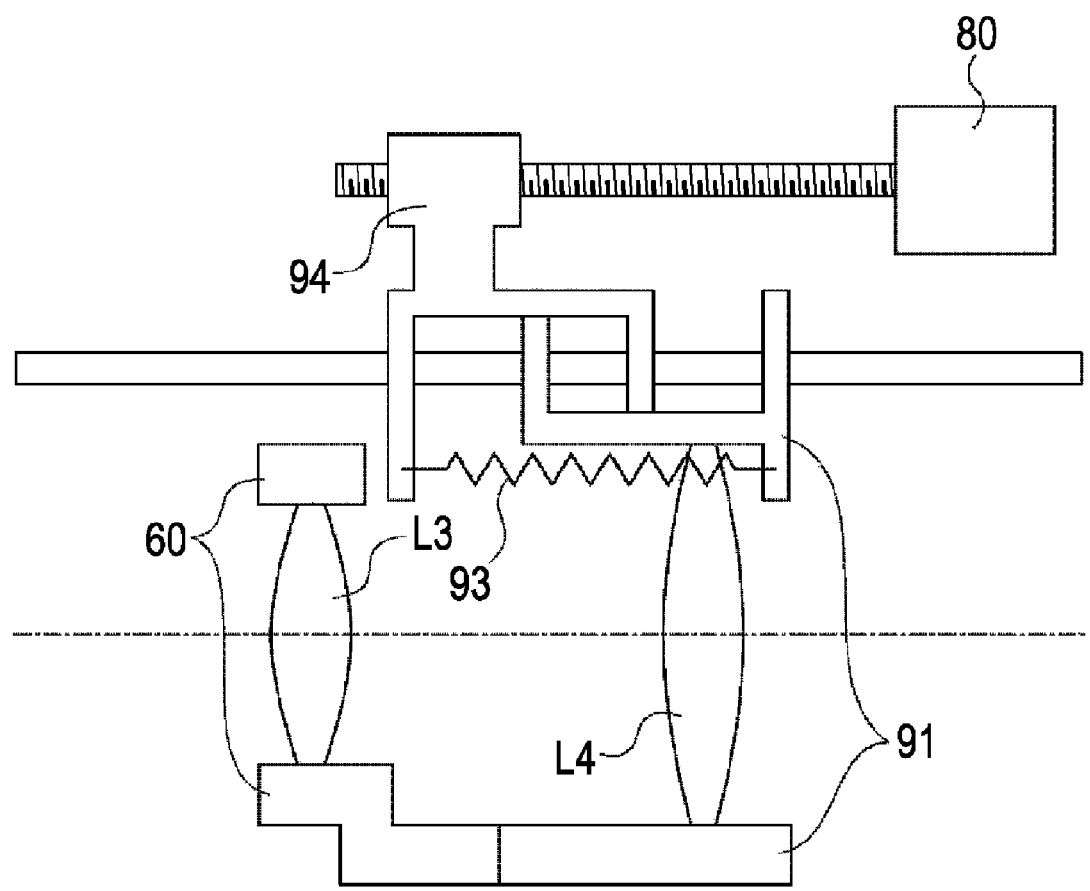
FIG. 7 is a schematic diagram that depicts a state in which a focus control operation lags in the lens barrel according to the first embodiment.

FIGS. 6 and 7 are schematic diagrams that depict FIGS. 4 and 5, respectively. FIG. 6 shows a state in which the focus-lens holding member 91 and the image-blur optical correction unit 60 are independently driven without interfering with each other. FIG. 7 shows a state in which the focus-lens holding member 91 and the image-blur optical correction unit 60 interfere with each other.

The image-blur optical correction unit 60 holds the third zoom lens set L3. The focus-lens holding member 91 holds the focus lens set L4. The focus-lens holding member 91 and the rack 94 are relatively urged along the optical axis by the extension spring 93. The focus-lens holding member 91 is moved along the optical axis by virtue of the mesh of the focus motor unit 80 and the rack 94.

When interference occurs between the focus-lens holding member 91 and the image-blur optical correction unit 60, the interference is absorbed by displacement of the extension spring 93 by an interference stroke.

The focus-lens holding member 91 and the rack 94 are separated apart from each other along the optical axis. That is, when interference occurs between the focus-lens holding member 91 and the image-blur optical correction unit 60, the extension spring 93 is extended by an interference stroke.

Accordingly, even when interference occurs between the focus-lens holding member 91 and the image-blur optical correction unit 60, an advantage can be obtained that reduces an impact on the rack 94.

Second Exemplary Embodiment

Figure 8:
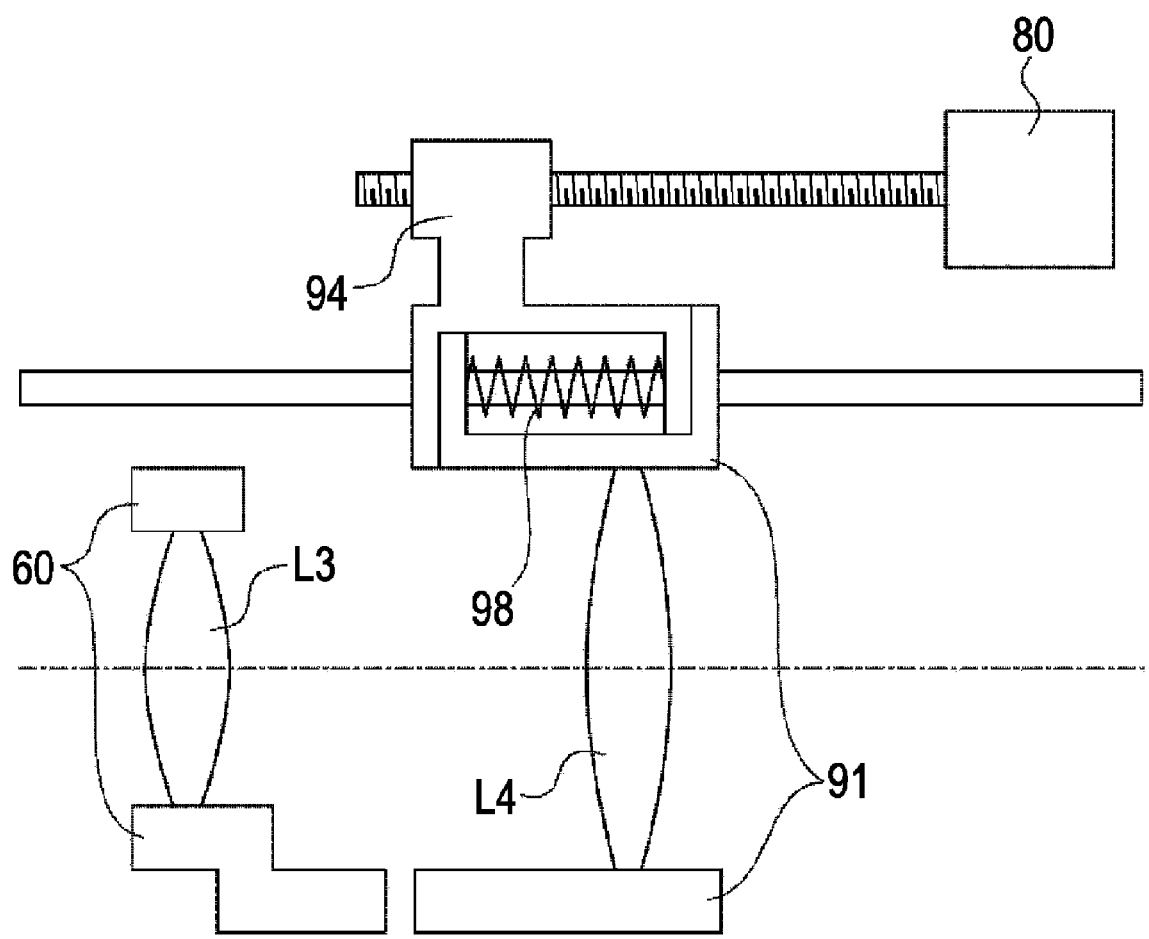
FIG. 8 is a schematic diagram of the focus lens unit in the lens barrel according to a second embodiment.
Figure 9:
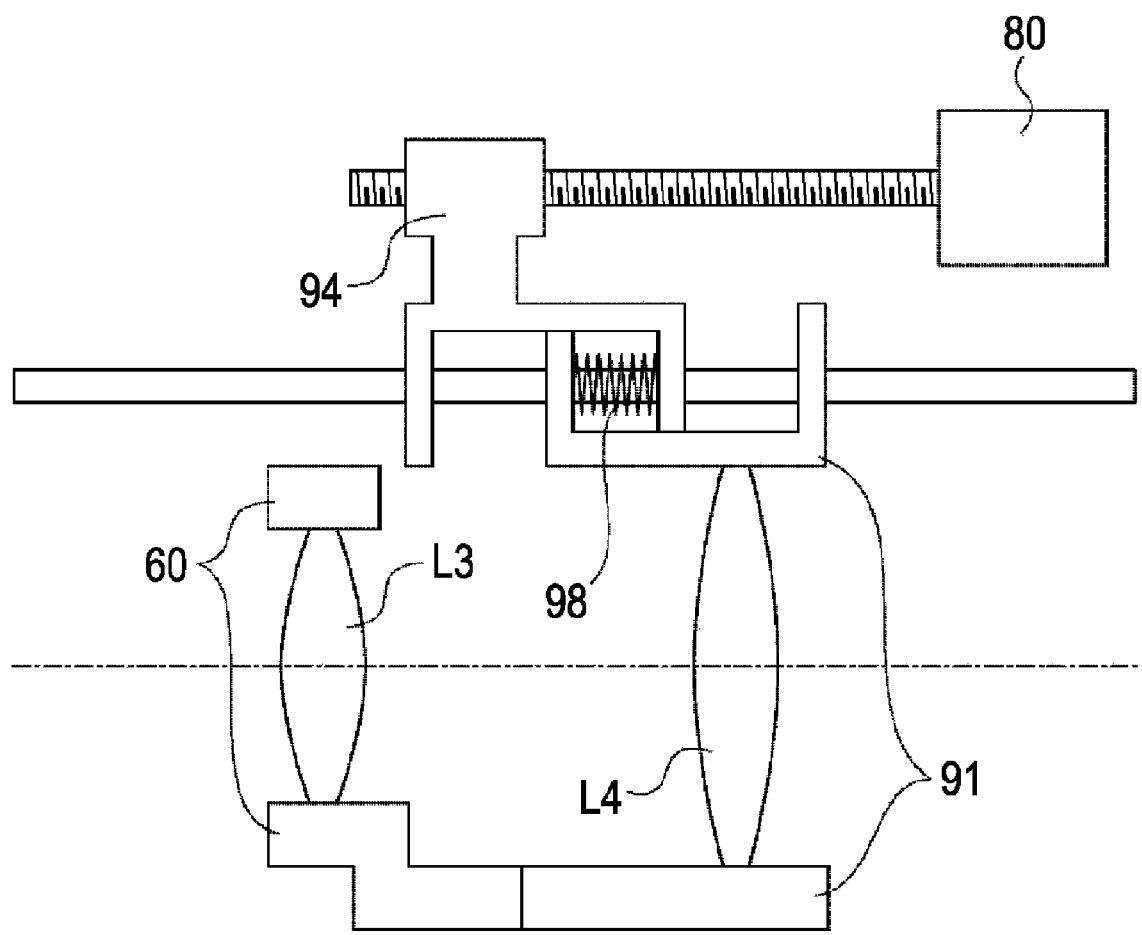
FIG. 9 is a schematic diagram that depicts a state in which a focus control operation lags in the lens barrel according to the second embodiment.

FIGS. 8 and 9 are schematic diagrams that illustrate a modification in which the extension spring 93, which is an urging member, is replaced with a compression spring 98 in the lens barrel of the first embodiment.

The configuration of a lens barrel for use in an imaging device to which the second embodiment is applicable, such as a video camera and a digital still camera and a general configuration of a focus lens unit are substantially the same as those in the first embodiment, so the description thereof is not repeated here.

FIG. 8 shows a state in which the focus-lens holding member 91 and the image-blur optical correction unit 60 are independently driven without interfering with each other. FIG. 9 shows a state in which the focus-lens holding member 91 and the image-blur optical correction unit 60 interfere with each other.

The image-blur optical correction unit 60 holds the third zoom lens set L3. The focus-lens holding member 91 holds the focus lens set L4. The focus-lens holding member 91 and the rack 94 are relatively urged along the optical axis by the compression spring 98. The focus-lens holding member 91 is moved along the optical axis by virtue of the mesh of the focus motor unit 80 and the rack 94.

When interference occurs between the focus-lens holding member 91 and the image-blur optical correction unit 60, the interference is absorbed by displacement of the compression spring 98 by an interference stroke.

The focus-lens holding member 91 and the rack 94 are separated apart from each other along the optical axis. That is, when interference occurs between the focus-lens holding member 91 and the image-blur optical correction unit 60, the compression spring 98 is compressed by an interference stroke.

Accordingly, even when interference occurs between the focus-lens holding member 91 and the image-blur optical correction unit 60, an advantage can be obtained that reduces an impact on the rack 94.

In the above-described embodiments, a cam is not used to couple the third zoom lens set L3 and the focus lens set L4. This can result in a reduction in the size of the lens barrel caused by a reduction in the size of the cam ring, omit a component required for cam coupling, and contribute to a simplified structure of components.

In the above-described embodiments, interference occurs between the focus lens unit and the image-blur optical correction unit. However, it is evident that a unit configured to absorb interference can be disposed between the focus lens unit and an adjacent member that enters a range of motion thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-009158 filed Jan. 18, 2007 and No. 2007-227606 filed Sep. 3, 2007, which are hereby incorporated by reference herein in their entirety.

What is claimed is:

1. A lens barrel comprising:
   a first lens set configured to move manually along an optical axis;
   a second lens set configured to move electrically along the optical axis;
   a first holding member configured to hold the first lens set;
   a second holding member configured to hold the second lens set;

a driving member configured to move the second holding member along the optical axis;

a transmitting member configured to transmit a driving force of the driving member to the second holding member and move in a direction of an optical axis by the driving force of the driving member; and an urging member configured to relatively urge the transmitting member and the second holding member along the optical axis, wherein the first lens set is movable within a range of motion of the second lens set, and the urging member is displaced when the second holding member interferes with the first holding member.

2. The lens barrel according to claim 1, wherein the first lens set is a zoom lens set, and the second lens set is a focus lens set.

3. The lens barrel according to claim 1, wherein the relationship $A<B$ is satisfied, where A is the total weight of the second lens set and the second holding member and B is the urging force of the urging member when displacement is at a minimum.

4. The lens barrel according to claim 1, wherein the relationship $B'<C$ is satisfied, where B' is the urging force of the urging member when displacement is at a maximum and C is the minimum force generated by the driving member.

5. The lens barrel according to claim 1, wherein the relationship $D<E$ is satisfied, where D is the overlap range of a range of motion of the first lens set and a range of motion of the second lens set and E is the distance along the optical axis between the transmitting member and the second holding member when displacement of the urging member is at a maximum.

6. The lens barrel according to claim 1, wherein the transmitting member and the second holding member are engaged such that relative rotation thereof is prevented.

7. An imaging apparatus comprising:
a lens barrel including,
a first lens set configured to move manually along an optical axis;
a second lens set configured to move electrically along the optical axis;
a first holding member configured to hold the first lens set;
a second holding member configured to hold the second lens set;
a driving member configured to move the second holding member along the optical axis;
a transmitting member configured to transmit a driving force of the driving member to the second holding member and move in a direction of an optical axis by the driving force of the driving member; and
an urging member configured to relatively urge the transmitting member and the second holding member along the optical axis,
wherein the first lens set is movable within a range of motion of the second lens set, and the urging member is displaced when the second holding member interferes with the first holding member.

* * * * *